United States Patent
Shi et al.

(10) Patent No.: US 9,781,651 B2
(45) Date of Patent: Oct. 3, 2017

(54) METHOD, DEVICE AND SYSTEM FOR CONTROLLING UE TO TAKE MEASUREMENTS

(75) Inventors: Lirong Shi, Shenzhen (CN); Meifang He, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 144 days.

(21) Appl. No.: 14/000,119

(22) PCT Filed: Nov. 8, 2011

(86) PCT No.: PCT/CN2011/081929
§ 371 (c)(1),
(2), (4) Date: Aug. 16, 2013

(87) PCT Pub. No.: WO2012/109923
PCT Pub. Date: Aug. 23, 2012

(65) Prior Publication Data
US 2013/0324131 A1  Dec. 5, 2013

(30) Foreign Application Priority Data
Feb. 17, 2011 (CN) .......... 2011 1 0039960

(51) Int. Cl.
*H04W 36/30* (2009.01)
*H04W 24/02* (2009.01)
(Continued)

(52) U.S. Cl.
CPC .......... *H04W 36/30* (2013.01); *H04B 17/382* (2015.01); *H04W 24/02* (2013.01); *H04B 17/24* (2015.01); *H04B 17/318* (2015.01)

(58) Field of Classification Search
CPC . H04W 24/02; H04W 36/0083; H04W 84/18; H04W 36/0061; H04W 24/10;
(Continued)

(56) References Cited

U.S. PATENT DOCUMENTS

2009/0264130 A1* 10/2009 Catovic et al. ............... 455/436
2011/0028181 A1   2/2011 Byun et al.
(Continued)

FOREIGN PATENT DOCUMENTS

| CN | 101594631 A | 12/2009 |
|----|-------------|---------|
| CN | 101778369 A | 7/2010  |
| CN | 101925086 A | 12/2010 |

OTHER PUBLICATIONS

3GPP TS 36.300 V9.3.0, dated Mar. 2010.*
(Continued)

*Primary Examiner* — Daniel Lai
(74) *Attorney, Agent, or Firm* — Ladas & Parry LLP

(57) ABSTRACT

A method, device and system for controlling UE to take measurements are provided, the method comprising: an RNC notifying UE to take ANR measurements, and instructing UE with an ANR measurement threshold and that a reporting mode to be used by the UE is event reporting; the UE taking ANR measurements, and reporting a measurement result, wherein pre-set relationship is satisfied between the reported measurement result and the ANR measurement threshold. The technical solution presented in the disclosure solves the problem in the prior art of lack of specific procedure to control UE to report measurements, thereby acquiring the latest neighboring relationship in time, ensuring continuity of user calls, and enhancing the quality of service to users.

13 Claims, 3 Drawing Sheets

An RNC performs neighboring cell update decision — S302

The RNC sends the result to a network administrator to perform neighboring cell update — S304

(51) Int. Cl.
*H04B 17/382* (2015.01)
*H04B 17/24* (2015.01)
*H04B 17/318* (2015.01)

(58) Field of Classification Search
CPC ......... H04W 36/0088; H04W 52/0216; H04W 36/0094; H04W 36/30; H04B 17/382; H04B 17/24; H04B 17/318
See application file for complete search history.

(56) References Cited

U.S. PATENT DOCUMENTS

| | | | |
|---|---|---|---|
| 2012/0009918 A1* | 1/2012 | Wu ............................... | 455/423 |
| 2012/0015657 A1* | 1/2012 | Comsa .............. | H04W 36/0094 |
| | | | 455/436 |
| 2012/0092998 A1* | 4/2012 | Chang et al. ................ | 370/241 |

OTHER PUBLICATIONS

3GPP TS 37.320 V1.0.0, dated Aug. 2010.*
LTE Network Infrastructure and Elements by LTE Encyclopedia, archived on Jan. 4, 2011.*
Chinese Office Action dated Oct. 23, 2015 for Chinese Application No. 201110039960.5.
English abstract of CN 101778369 A Jul. 2010.
English abstract of CN 101594631 A Dec. 2, 2009.
English abstract of CN 101925086 A Dec. 22, 2009.

* cited by examiner

METHOD, DEVICE AND SYSTEM FOR CONTROLLING UE TO TAKE MEASUREMENTS

RELATED APPLICATION INFORMATION

This application is a 371 of International Application PCT/CN2011/081929 filed 8 Nov. 2011 entitled "Method, Device, and System for Controlling UE to Take Measurements", which was published on 23 Aug. 2012, with International Publication Number WO 2012/109923 A1, and which claims priority from CN Application No. 201110039960.5 filed 17 Feb. 2011, the contents of which are incorporated herein by reference.

TECHNICAL FIELD

The disclosure relates to the field of communications, and particularly, to a method, device and system for controlling user equipment to take measurements.

BACKGROUND

Ensuring service continuity of a mobile user is a basic function of a cellular mobile communication system, and handover of a serving cell of a mobile station is main means of ensuring the service continuity. In order to facilitate handover of UE (User Equipment), the system needs to configure neighboring relationship for each cell, so that the network side notifies the user equipment of neighbor cell information. The user equipment measures neighbor cells according to the neighbor cell information and then reports a measurement result. The network side then instructs the user equipment to hand over to a certain neighbor cell according to the reported measurement result.

Which neighbor cells are around a certain cell is not only related to a cell distance, but also closely related to a wireless environment where the cell is. Because the wireless environment is complicated, it is very difficult to determine exactly which neighbor cells should be configured for a certain cell at the beginning of network planning, especially in a city environment with dense high buildings. Some other situations will cause that the neighbor cell information is not updated in time, for example, one cell is newly added in the system or an attribute of a cell changes, but the neighboring relationship of the cell is not updated in time, or there is change of environment or omission of a network planner. Thus, the user equipment will not be able to hand over to another cell in time, and the following situations may occur: the load of the current cell will be too high, the signal quality of the current cell becomes worse, the interference is serious or user call drops may occur, and so on. Hence, an ANR (Automatic Neighboring Relationship Function) task is introduced in the 3GPP (3rd Generation partnership project) conference, but there is still no specific procedure about how to control UE to take and report measurements.

SUMMARY

With respect to the problem in the related art that there is no specific procedure to control UE to report measurements, the disclosure provides a method, device and system for controlling user equipment to take measurements, so as to solve the above-mentioned problem.

According to one aspect of the disclosure, a method for controlling user equipment to take measurements is provided, including: a radio network controller (RNC) notifying UE to take automatic neighboring relationship function (ANR) measurements and instructing the UE with an ANR measurement threshold and that a reporting mode to be used by the UE is event reporting; and the UE taking the ANR measurements and reporting a measurement result, wherein pre-set relationship is satisfied between the reported measurement result and the ANR measurement threshold.

The RNC notifying the UE to take the ANR measurements and instructing the UE with the ANR measurement threshold and that the reporting mode to be used by the UE is event reporting includes: the RNC sending to the UE a notification message which notifies the UE to take the ANR measurements, wherein the notification message carries the ANR measurement threshold and an instruction that a measurement reporting mode is event reporting.

Instructing the UE with the ANR measurement threshold and that the reporting mode to be used by the UE is event reporting includes: carrying, in the notification message, an information cell the value of which is event reporting and an information cell including the ANR measurement threshold; or carrying, in the notification message, an information cell including the ANR measurement threshold.

The notification message further carries a physical quantity to be measured, wherein the physical quantity includes at least one of the following: Common Pilot Channel Energy per chip Noise Ratio, Common Pilot Channel Received Signal Code Power, Primary Common Control Physical Channel Received Signal Code Power, Timeslot Interference on Signal Code Power Pathloss.

The UE taking the ANR measurements and reporting the measurement result, wherein the pre-set relationship is satisfied between the reported measurement result and the ANR measurement threshold, includes: the UE measuring the physical quantity to be measured carried in the notification message; when satisfying the pre-set relationship, the UE sending an instruction message to the RNC, wherein the pre-set relationship includes: a pre-set size relationship which is satisfied between a physical quantity measured by the UE and the ANR measurement threshold; after receiving the instruction message, the RNC sending an ANR information request to the UE; and after receiving the ANR information request, the UE reporting the measurement result by carrying the measurement result in a measurement report.

The measurement report is carried in an additional measurement report or a radio resource control (RRC) message for reporting, wherein the RRC message is one of the following: an initial direct transfer message, a measurement report, a wireless network control connection request message, an uplink direct transfer message, a cell update message.

After the UE takes the ANR measurements and uses the reporting mode of event reporting to report the measurement result, the method further includes: the RNC making handover decision and/or updating neighboring cell configuration according to the measurement result.

In the situation where the RNC makes the handover decision according to the measurement result, the RNC making the handover decision according to the measurement result includes: the RNC counting cell information in the measurement result, and if the number of times reporting the cell information about a cell reaches a first threshold, then confirming to take the cell as a target handover cell; or the RNC sending the measurement result to a network administrator, and the network administrator counting the cell information in the measurement result, if the number of times reporting the cell information about a cell reaches a second threshold, then confirming to take the cell as the target handover cell.

In the situation where the RNC updates the neighboring cell configuration according to the measurement result, the RNC updating the neighboring cell configuration according to the measurement result includes: the RNC counting cell information in the measurement result, and if the number of times reporting the cell information about a cell reaches a third threshold, then confirming to configure the cell as a neighboring cell, reporting the neighboring cell to a network administrator, and updating the neighboring cell configuration; or the RNC sending the measurement result to a network administrator, and the network administrator counting the cell information in the measurement result, if the number of times reporting the cell information about a cell reaches a fourth threshold, then confirming to configure the cell as a neighboring cell, and updating the neighboring cell configuration.

The notification message includes one of the following: a system broadcast message, a measurement control message, and a customized message.

According to another aspect of the disclosure, a radio network controller is provided, including: a notification module, configured to notify user equipment (UE) to take automatic neighboring relationship function (ANR) measurements; an instruction module, configured to instruct the UE with an ANR measurement threshold and that a reporting mode to be used by the UE is event reporting; and a receiving module, configured to receive a measurement result reported after the UE takes the ANR measurements, wherein pre-set relationship is satisfied between the reported measurement result and the ANR measurement threshold.

The radio network controller further includes: a deciding and/or updating module, configured to make handover decision and/or update neighboring cell configuration according to the measurement result reported by the UE.

According to still another aspect of the disclosure, user equipment (UE) is provided, including: a receiving module, configured to receive, from a radio network controller (RNC), a notification of taking automatic neighboring relationship function (ANR) measurements, determine to use a reporting mode of event reporting according to an instruction of the RNC, and acquire an ANR measurement threshold instructed by the RNC; a measurement module, configured to take the ANR measurements in response to the notification of taking the ANR measurements from the RNC; and a reporting module, configured to report a measurement result, wherein pre-set relationship is satisfied between the reported measurement result and the ANR measurement threshold.

According to still another aspect of the disclosure, a system for controlling user equipment to take measurements is provided, including: the above radio network controller and the above user equipment.

According to still another aspect of the disclosure, a method for controlling user equipment to take measurements is provided, including: user equipment (UE) receiving an automatic neighboring relationship function (ANR) measurement notification message sent by a radio network controller (RNC), wherein the ANR measurement notification message carries an ANR measurement threshold; the UE taking ANR measurements and sending an instruction message to the RNC when a pre-set event reporting condition is satisfied; and after receiving an ANR information request, which is sent by the RNC in response to the instruction message, the UE reporting a measurement result by carrying the measurement result in a measurement report.

According to still another aspect of the disclosure, a method for controlling user equipment to take measurements is provided, including: a radio network controller (RNC) sending to user equipment (UE) an automatic neighboring relationship function (ANR) measurement notification message to notify the UE to take ANR measurements, wherein the ANR measurement notification message carries an ANR measurement threshold; the RNC receiving an instruction message, which is sent by the UE when a pre-set event reporting condition is satisfied; and the RNC sending an ANR information request to the UE in response to the instruction message to notify the UE to report a measurement result by carrying the measurement result in a measurement report.

According to still another aspect of the disclosure, a radio network controller is provided, including: a notification module, configured to send to user equipment (UE) an automatic neighboring relationship function (ANR) measurement notification message, wherein the ANR measurement notification message carries an ANR measurement threshold; a requesting module, configured to receive an instruction message, which is sent by the UE when a pre-set event reporting condition is satisfied, and send an ANR information request to the UE; and a receiving module, configured to receive a measurement result reported by the UE.

According to still another aspect of the disclosure, user equipments provided, including: a receiving module, configured to receive an automatic neighboring relationship function (ANR) measurement notification message sent by a radio network controller (RNC), wherein the ANR measurement notification message carries an ANR measurement threshold; a measurement module, configured to take ANR measurements and send an instruction message to the RNC when a pre-set event reporting condition is satisfied; and a reporting module, configured to receive an ANR information request, which is sent by the RNC in response to the instruction message, and report a measurement result by carrying the measurement result in a measurement report.

According to still another aspect of the disclosure, a system for controlling user equipment to take measurements is provided, including: the above radio network controller and the above user equipment.

By way of the disclosure, the RNC notifies the UE to take ANR measurements, instructs the UE with the ANR measurement threshold and that a reporting mode to be used by the UE is event reporting, the UE takes ANR measurements and reports a measurement result using the mode of event reporting, the problem in the related art that there is still no specific procedure to control UE to take and report measurements is solved, thus achieving the effects of acquiring the latest neighboring cell relationship in time, ensuring the continuity of user calls, and enhancing the quality of service to users.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
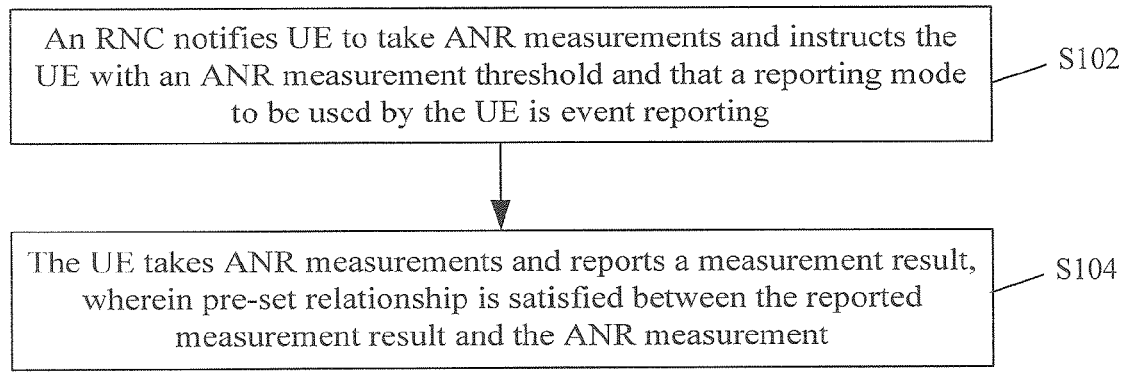
FIG. 1 is a flowchart of a method for controlling user equipment to take measurements according to an embodiment of the disclosure.

FIG. 1 is a flowchart of a method for controlling user equipment to take measurements according to an embodiment of the disclosure. As shown in FIG. 1, a method for controlling user equipment to take measurements according to the embodiment of the disclosure includes:

Step S102: an RNC notifies UE to take ANR measurements and instructs the UE with an ANR measurement threshold and that a reporting mode to be used by the UE is event reporting; and Step S104: the UE takes ANR measurements and reports the measurement result, wherein pre-set relationship is satisfied between the measurement result and the ANR measurement threshold.

The above-mentioned method gives out a feasible procedure to control UE to take measurements, which makes it clear that the UE takes ANR measurements under the control of the RNC and establishes a subject/object relationship. The RNC notifies the UE to use the event reporting mode to report the measurement result and the ANR measurement threshold when notifying the UE to take the ANR measurements, and the UE can complete the measurement and reporting according to the information. The entire method is simple and feasible, which fills up the blank in the related art.

Preferably, Step S102 may further include the following processing: the RNC sends a notification message to the UE for notifying the UE to take ANR measurements, wherein the notification message carries the ANR measurement threshold and an instruction that a measurement reporting mode is event reporting.

During specific implementation, the RNC can notify the UE to take ANR measurements in the form of sending a notification message, wherein the information required by the UE to take and report measurements can also be carried in this notification message.

Preferably, the modes that the RNC instructs the UE with the ANR measurement threshold and that the reporting mode to be used by the UE is event reporting may include one of the following:

(1) carrying, in the notification message, an information cell the value of which is event reporting and an information cell comprising the ANR measurement threshold;

(2) carrying, in the notification message, an information cell comprising the ANR measurement threshold.

The difference in the above-mentioned modes actually is mainly reflected in the difference in notification message compositions. In mode (1), the notification message carries two information cells, which are respectively used for instructing the UE to use the event reporting mode and providing an ANR measurement threshold to the UE so that the UE can judge which event to report. In mode (2), the notification message merely carries one information cell and does not carry the information cell the value of which is event reporting, and in the case that the RNC and the UE have arrived at an agreement on the reporting mode, the RNC merely needs to provide the ANR measurement threshold to the UE, so only one information cell is needed. Actually, the ANR measurement threshold is a judgment criteria of event reporting, which per se can represent that the RNC instructs the UE to use the event reporting mode.

Preferably, the above-mentioned notification message can also carry a physical quantity to be measured, which physical quantity can include at least one of the following: Common Pilot Channel Energy per chip Noise Ratio (referred to as CPICH Ec/N0 in short), Common Pilot Channel Received Signal Code Power (referred to as CPICH RSCP in short), Primary Common Control Physical Channel Received Signal Code Power (referred to as Primary CCPCH RSCP in short), Timeslot Interference on Signal Code Power Pathloss (referred to as Timeslot ISCP Pathloss in short).

The practice of carrying a physical quantity to be measured in the notification message can instruct the UE to measure which physical quantities in real time, so that the measurement is more targeted and more flexible in application, which can greatly improve the working efficiency. The physical quantities listed above reflect different states of a cell, and one or more of the physical quantities can be selected to be measured according to different situations during specific implementation. Of course, the physical quantities can also be expanded, and more physical quantities can be selected to be measured.

Preferably, Step S104 may further include the following processing:

(1) the UE measures the physical quantity to be measured carried in the notification message;

(2) when the above-mentioned pre-set relationship is satisfied, the UE sends an instruction message to the RNC, wherein the above-mentioned pre-set relationship includes: a pre-set size relationship which is satisfied between a physical quantity measured by the UE and the ANR measurement threshold;

(3) after receiving the instruction message, the RNC sends an ANR information request to the UE; and (4) after receiving the ANR information request, the UE reports the measurement result by carrying the measurement result in a measurement report.

When the UE takes ANR measurements, it particularly includes: the UE measures a physical quantity to be measured carried in the ANR measurement notification message, and sends an instruction message to the RNC when a pre-set event reporting condition is satisfied, after receiving the instruction message, the RNC sends an ANR information request to the UE (which can also be sent by other devices at the network side), and after receiving the ANR information request sent from the network side, the UE sends a measurement report carrying the measurement result to the network side. Here, the pre-set event reporting condition can be that the physical quantity measured by the UE and the ANR measurement threshold satisfy a pre-set size relationship, i.e., the physical quantity measured by the UE is compared with the ANR measurement threshold, and if the pre-set size relationship is satisfied, it is deemed that the event reporting condition is satisfied. The particular size relationship, for example, greater or smaller or equal, may change according to different physical quantities. For example, the physical quantity measured by the UE is greater than or not smaller than the ANR measurement threshold, or, the physical quantity measured by the UE is smaller than or not greater than the ANR measurement threshold.

During specific implementation, the particular values of the measured physical quantities may also be added into the measurement report.

Preferably, the above-mentioned measurement report can be reported by being carried in an additional measurement report or an RRC message, wherein the above-mentioned RRC message can be one of the following: an INITIAL DIRECT TRANSFER message, a MEASUREMENT REPORT, an RRC CONNECTION REQUEST message, an UPLINK DIRECT TRANSFER message, and a CELL UPDATE message.

The above-mentioned Additional Measurement Report is a newly added message, which is defined as an additional measurement report and dedicated to reporting the measurement result. The UE may also use an existing RRC message to report the measurement result, and the actually available message includes but not limited to the RRC message listed above.

Preferably, after Step S104, the method may further include the following processing: the RNC makes handover decision and/or updates neighboring cell configuration according to the measurement result.

The measurement result obtained from the ANR measurements performed by the UE mainly has two functions: one is to be directly used as a basis for handover decision to be referenced by the RNC, and the other is to update the current neighboring cell configuration, so that the neighboring cell relationship keeps in the latest state all the time. Either of these two functions can be performed or both of them can be performed simultaneously.

Preferably, in the case that the RNC makes handover decision according to the measurement result, before the RNC makes handover decision according to the measurement result, the method may further include one of the following processing:

(1) the RNC counts the cell information in the measurement result, and if the number of times reporting the cell information about a certain cell reaches a first threshold, then confirms to take that cell as a target handover cell;

(2) the RNC sends the measurement result to a network administrator; the network administrator counts the cell information in the measurement result, and if the number of times reporting the cell information about a certain cell reaches a second threshold, then confirms to take that cell as a target handover cell.

The handover decision can be made by the RNC or by the network administrator. Regardless of being made by the RNC or the network administrator, the basic principles are the same, i.e., the cell information in the measurement result is counted, and when the number of times reporting the cell information about a certain cell reaches a certain number (a first threshold value or a second threshold value), this cell can be confirmed as a target handover cell.

Preferably, in the case that the RNC updates neighboring cell configuration according to the measurement result, before the RNC updates the neighboring cell configuration according to the measurement result, the method may further include one of the following processing:

(1) the RNC counts the cell information in the measurement result, and if the number of times reporting the cell information about a certain cell reaches a third threshold, then confirms to configure that cell as a neighboring cell, reports the neighboring cell to a network administrator, and updates the neighboring cell configuration;

(2) the RNC sends the measurement result to a network administrator; the network administrator counts the cell information in the measurement result, and if the number of times reporting the cell information about a certain cell reaches a fourth threshold, then confirms to configure that cell as a neighboring cell, and updates the neighboring cell configuration.

Likewise, when updating the neighboring cell configuration, it can be done by the RNC or by the network administrator, and the basic principles thereof are the same, i.e. the cell information in the measurement result is counted, and when the number of times reporting the cell information about a certain cell reaches a certain number (a third threshold value or a fourth threshold value), this cell can be configured as a neighboring cell and the neighboring cell configuration will be updated accordingly.

Preferably, the above-mentioned notification message includes one of the following: a system broadcast message, a measurement control message, and a customized message.

During specific implementation, the ANR measurement notification message may be sent in the form of a system broadcast message or a measurement control message, for example, a system information block 11 (SIB11), a system information block 11bis (SIB11bis), a system information block 12 (SIB12), a measurement control command (Measurement Control), and a customized logging message (Logging Message) can also be added newly to send the ANR measurement notification message.

Hereinafter, the processing after the radio network controller receives the ANR measurement report reported by the UE will be described in detail in combination with examples and FIGS. 2 to 4.

Figure 2:
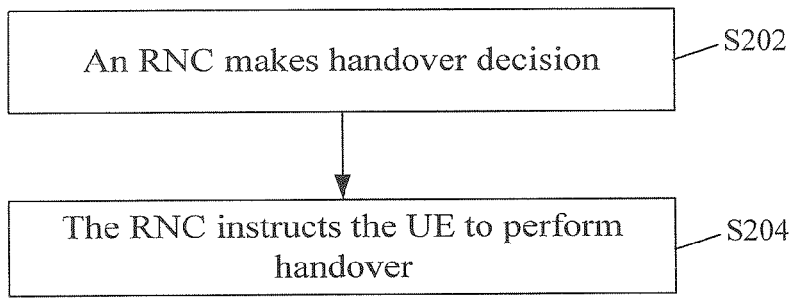
FIG. 2 is a processing flowchart of a radio network controller receiving an ANR measurement report reported by UE according to a first embodiment of the disclosure.

FIG. 2 is a processing flowchart of a radio network controller receiving an ANR measurement report reported by UE according to a first embodiment of the disclosure. As shown in FIG. 2, the procedure includes the following steps.

Step S202: the RNC receives the ANR measurement report from the UE and makes handover decision.

The decision method is as follows: counting is performed according to the cell information in the ANR measurement report of the UE, and if the reported cell information has accumulated to a certain number of times, then it is decided to hand over to the target cell.

Step S204: the RNC instructs the UE to perform handover.

Figure 3:
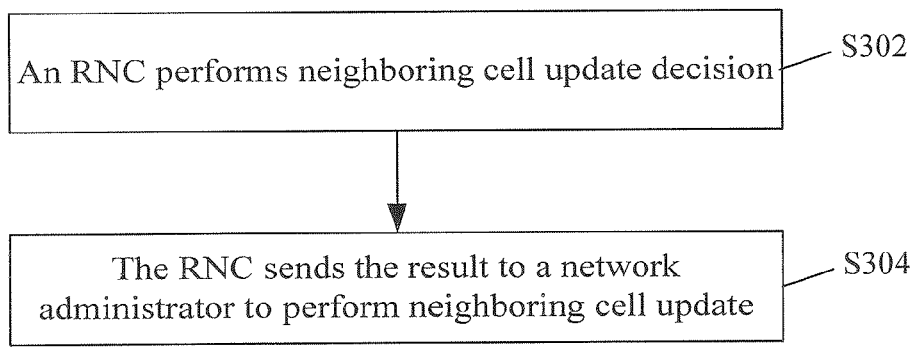
FIG. 3 is a processing flowchart of a radio network controller receiving an ANR measurement report reported by UE according to a second embodiment of the disclosure.

FIG. 3 is a processing flowchart of a radio network controller receiving an ANR measurement report reported by UE according to a second embodiment of the disclosure. As shown in FIG. 3, the procedure includes the following steps.

Step S302: the RNC receives the ANR measurement report from the UE and performs neighboring cell update decision.

The decision method is as follows: counting is performed according to the cell information in the ANR measurement report of the UE, and if the reported cell information has accumulated to a certain number of times, then this cell will be configured as a neighboring cell.

Step S304: the RNC sends the result to a network administrator, and the neighboring cell is updated automatically.

Figure 4:
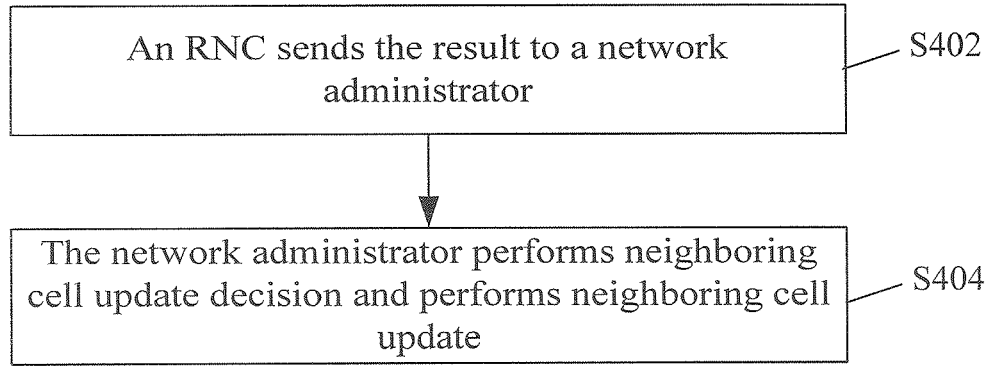
FIG. 4 is a processing flowchart of a radio network controller receiving an ANR measurement report reported by UE according to a third embodiment of the disclosure.

FIG. 4 is a processing flowchart of a radio network controller receiving an ANR measurement report reported by UE according to a third embodiment of the disclosure. As shown in FIG. 4, the procedure includes the following steps.

Step S402: the RNC receives the ANR measurement report from the UE and sends the result to a network administrator.

Step S404: the network administrator performs neighboring cell update decision and performs update automatically.

The decision method is as follows: counting is performed according to the result sent from the RNC, and if the reported cell information has accumulated to a certain number of times, then this cell will be configured as a neighboring cell.

Figure 5:
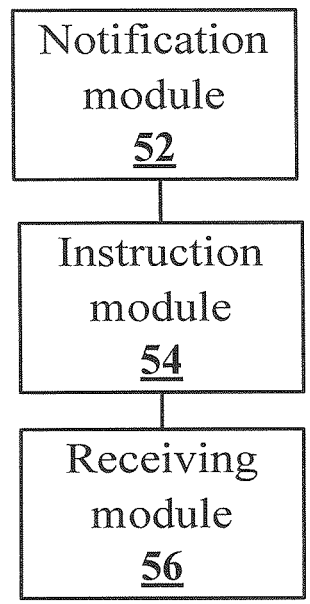
FIG. 5 is a structure block diagram of a radio network controller according to an embodiment of the disclosure.

FIG. 5 is a structure block diagram of a radio network controller according to an embodiment of the disclosure. As shown in FIG. 5, the radio network controller according to an embodiment of the disclosure includes:

a notification module 52, configured to notify UE to take ANR measurements;

an instruction module 54, configured to instruct the UE with an ANR measurement threshold and that a reporting mode to be used by the UE is event reporting; and a receiving module 56, configured to receive measurement result reported after the UE takes ANR measurements, wherein pre-set relationship is satisfied between the reported measurement result and the ANR measurement threshold.

The above-mentioned radio network controller is mainly responsible for controlling the UE to take ANR measurements, the notification module 52 notifies the UE to start to take ANR measurements, the instruction module 54 instructs with the ANR measurement threshold and that the reporting mode to be used by the UE is event reporting, and the receiving module 56 finally receives the measurement result reported by the UE, wherein the pre-set relationship, which can be configured according to actual needs, is satisfied between the reported measurement result and the ANR measurement threshold.

Preferably, the radio network controller according to an embodiment of the disclosure may further include:

a deciding and/or updating module (not shown in the figure), configured to make handover decision and/or update neighboring cell configuration according to the measurement result reported by the UE.

After finally obtaining the measurement result, the RNC can directly use the same as a basis for handover decision, and can also use the same to update the current neighboring cell configuration, so that the neighboring cell relationship keeps in the latest state all the time.

Figure 6:
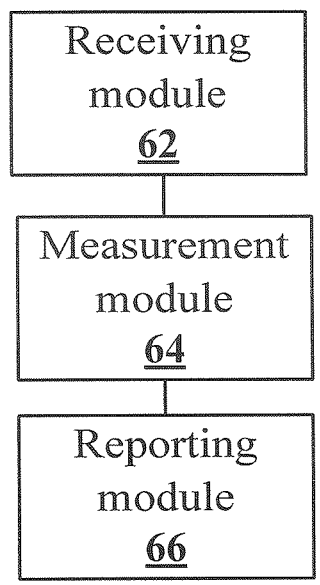
FIG. 6 is a structure block diagram of user equipment according to an embodiment of the disclosure.

FIG. 6 is a structure block diagram of user equipment according to an embodiment of the disclosure. As shown in FIG. 6, the user equipment according to an embodiment of the disclosure includes:

a receiving module 62, configured to receive, from a radio network controller (RNC), a notification of taking automatic neighboring relationship function (ANR) measurements, determine to use a reporting mode of event reporting according to an instruction of the RNC, and acquire an ANR measurement threshold instructed by the RNC;

a measurement module 64, configured to take the ANR measurements in response to the notification of taking the ANR measurements from the RNC; and a reporting module 66, configured to report a measurement result, wherein pre-set relationship is satisfied between the reported measurement result and the ANR measurement threshold.

The above-mentioned UE is mainly used to complete ANR measurements and report the required measurement result under the control of the RNC, the receiving module 62 receives the notification from the RNC and acquires various information required to complete the ANR measurements and reporting, the measurement module 64 completes the ANR measurements, and the reporting module 66 finally reports the measurement result that satisfy pre-set relationship regarding the ANR measurement threshold.

Figure 7:
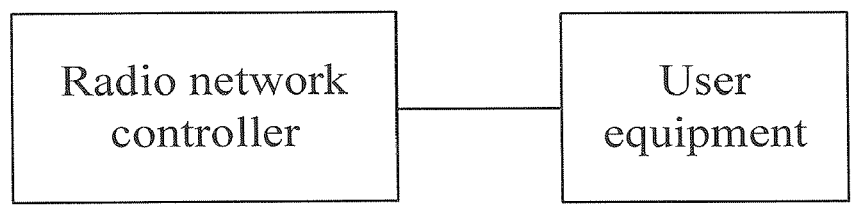
FIG. 7 is a structure block diagram of a system for controlling user equipment to take measurements according to an embodiment of the disclosure.

FIG. 7 is a structure block diagram of a system for controlling user equipment to take measurements according to an embodiment of the disclosure. As shown in FIG. 7, the system for controlling user equipment to take measurements according to an embodiment of the disclosure includes: the above-mentioned radio network controller and the above-mentioned user equipment.

It can be seen from the above description that by way of the solution provided in the disclosure, the user equipment notifies the network side of the measurement result using event reporting mode after taking ANR measurements, thereby improving the learning capability of the network side to the neighbor cell information of the user equipment. The network side decides to perform handover according to the measurement result reported by the user equipment, thereby ensuring that the user equipment performs handover in time, effectively preventing call drop, ensuring the continuity of user calls, and enhancing the quality of service to users. In addition, the network side updates the neighboring cell and uses an updated neighbor list when delivering a measurement control message to user equipment which does not satisfy this measurement solution, thereby ensuring that the relevant user equipment hands over to a preferred cell in time and ensuring the continuity of user calls.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for controlling user equipment to take measurements, comprising:

user equipment (UE) receiving an automatic neighboring relationship function (ANR) measurement notification message sent by a radio network controller (RNC), wherein the ANR measurement notification message carries an ANR measurement threshold and a physical quantity to be measured;

the UE taking ANR measurements, and when a pre-set event reporting condition is satisfied, the UE sending an instruction message to the RNC, wherein the pre-set event reporting condition is satisfied in the case that a pre-set size relationship is satisfied between the physical quantity measured by the UE and the ANR measurement threshold; and after receiving an ANR information request, which is sent by the RNC in response to the instruction message, the UE reporting a measurement result by carrying the measurement result in a measurement report;

wherein after the UE reports the measurement result by carrying the measurement result in the measurement report, the method further comprises: the RNC making a handover decision and/or updating a neighboring cell configuration according to the measurement result;

wherein in the situation where the RNC makes the handover decision according to the measurement result, the RNC making the handover decision according to the measurement result comprises:

the RNC counting cell information in the measurement result, and if the number of times reporting the cell information about a cell reaches a first threshold, then confirming to take the cell as a target handover cell; or the RNC sending the measurement result to a network administrator, and the network administrator counting the cell information in the measurement result, if the number of times reporting the cell information about a cell reaches a second threshold, then confirming to take the cell as the target handover cell.

2. The method according to claim 1, wherein in the situation where the RNC updates the neighboring cell configuration according to the measurement result, the RNC updating the neighboring cell configuration according to the measurement result comprises:

the RNC counting cell information in the measurement result, and if the number of times reporting the cell information about a cell reaches a third threshold, then confirming to configure the cell as a neighboring cell, reporting the neighboring cell to a network administrator, and updating the neighboring cell configuration; or the RNC sending the measurement result to a network administrator, and the network administrator counting the cell information in the measurement result, if the number of times reporting the cell information about a cell reaches a fourth threshold, then confirming to configure the cell as a neighboring cell, and updating the neighboring cell configuration.

3. The method according to claim 2, wherein the ANR measurement notification message comprises one of the following: a system broadcast message, a measurement control message, and a customized message.

4. The method according to claim 1, wherein the ANR measurement notification message comprises one of the following: a system broadcast message, a measurement control message, and a customized message.

5. The method according to claim 1, wherein the ANR measurement notification message comprises one of the following: a system broadcast message, a measurement control message, and a customized message.

6. A method for controlling user equipment to take measurements, comprising:
a radio network controller (RNC) sending to user equipment (UE) an automatic neighboring relationship function (ANR) measurement notification message to notify the UE to take ANR measurements, wherein the ANR measurement notification message carries an ANR measurement threshold and a physical quantity to be measured;

the RNC receiving an instruction message, which is sent by the UE when a pre-set event reporting condition is satisfied, wherein the pre-set event reporting condition is satisfied in the case that a pre-set size relationship is satisfied between the physical quantity measured by the UE and the ANR measurement threshold; and the RNC sending an ANR information request to the UE in response to the instruction message to notify the UE to report a measurement result by carrying the measurement result in a measurement report;

wherein after the UE reports the measurement result by carrying the measurement result in the measurement report, the method further comprises: the RNC making a handover decision and/or updating a neighboring cell configuration according to the measurement result;

wherein in the situation where the RNC makes the handover decision according to the measurement result, the RNC making the handover decision according to the measurement result comprises:

the RNC counting cell information in the measurement result, and if the number of times reporting the cell information about a cell reaches a first threshold, then confirming to take the cell as a target handover cell; or the RNC sending the measurement result to a network administrator, and the network administrator counting the cell information in the measurement result, if the number of times reporting the cell information about a cell reaches a second threshold, then confirming to take the cell as the target handover cell.

7. The method according to claim 6, wherein in the situation where the RNC updates the neighboring cell configuration according to the measurement result, the RNC updating the neighboring cell configuration according to the measurement result comprises:

the RNC counting cell information in the measurement result, and if the number of times reporting the cell information about a cell reaches a third threshold, then confirming to configure the cell as a neighboring cell, reporting the neighboring cell to a network administrator, and updating the neighboring cell configuration; or the RNC sending the measurement result to a network administrator, and the network administrator counting the cell information in the measurement result, if the number of times reporting the cell information about a cell reaches a fourth threshold, then confirming to configure the cell as a neighboring cell, and updating the neighboring cell configuration.

8. The method according to claim 6, wherein the ANR measurement notification message comprises one of the following: a system broadcast message, a measurement control message, and a customized message.

9. A radio network controller, comprising:
a notification module, configured to send to user equipment (UE) an automatic neighboring relationship function (ANR) measurement notification message, wherein the ANR measurement notification message carries an ANR measurement threshold and a physical quantity to be measured;

a requesting module, configured to receive an instruction message, which is sent by the UE when a pre-set event reporting condition is satisfied, and send an ANR information request to the UE, wherein the pre-set event reporting condition is satisfied in the case that a pre-set size relationship is satisfied between the physical quantity measured by the UE and the ANR measurement threshold;
a receiving module, configured to receive a measurement result reported by the UE; and
a deciding and/or updating module, configured to make a handover decision and/or update a neighboring cell configuration according to the measurement result reported by the UE;
wherein the deciding and/or updating module is further configured to:
count cell information in the measurement result, and if the number of times reporting the cell information about a cell reaches a first threshold, confirm to take the cell as a target handover cell; or
send the measurement result to a network administrator so that the network administrator counts the cell information in the measurement result, if the number of times reporting the cell information about a cell reaches a second threshold, confirms to take the cell as the target handover cell.

10. A system for controlling user equipment to take measurements, comprising:
a radio network controller according to claim 9 and user equipment comprising:
a receiving module, configured to receive an automatic neighboring relationship function (ANR) measurement notification message sent by a radio network controller (RNC), wherein the ANR measurement notification message carries an ANR measurement threshold;
a measurement module, configured to take ANR measurements, and when a pre-set event reporting condition is satisfied, send an instruction message to the RNC; and
a reporting module, configured to receive an ANR information request, which is sent by the RNC in response to the instruction message, and report a measurement result by carrying the measurement result in a measurement report.

11. The radio network controller according to claim 9, the deciding and/or updating module is configured to:
count cell information in the measurement result, and if the number of times reporting the cell information about a cell reaches a third threshold, confirm to configure the cell as a neighboring cell, report the neighboring cell to a network administrator, and update the neighboring cell configuration; or
send the measurement result to a network administrator so that the network administrator counts the cell information in the measurement result, if the number of times reporting the cell information about a cell reaches a fourth threshold, confirms to configure the cell as a neighboring cell, and updates the neighboring cell configuration.

12. The radio network controller according to claim 9, wherein the ANR measurement notification message comprises one of the following: a system broadcast message, a measurement control message, and a customized message.

13. A user equipment, comprising:
a receiving module, configured to receive an automatic neighboring relationship function (ANR) measurement notification message sent by a radio network controller (RNC), wherein the ANR measurement notification message carries an ANR measurement threshold and a physical quantity to be measured;
a measurement module, configured to take ANR measurements and send an instruction message to the RNC when a pre-set event reporting condition is satisfied, wherein the pre-set event reporting condition is satisfied in the case that a pre-set size relationship is satisfied between the physical quantity measured by the UE and the ANR measurement threshold; and
a reporting module, configured to receive an ANR information request, which is sent by the RNC in response to the instruction message, and report a measurement result by carrying the measurement result in a measurement report, wherein after the reporting the measurement result by carrying the measurement result in the measurement report, a handover decision and/or updating a neighboring cell configuration is made by the RNC according to the measurement result; wherein cell information in the measurement result is counted by the RNC, and if the number of times reporting the cell information about a cell reaches a first threshold, then the cell is taken as a target handover cell; or the measurement result is sent by the RNC to a network administrator, and the cell information in the measurement result is counted by the network administrator, if the number of times reporting the cell information about a cell reaches a second threshold, then the cell is taken as the target handover cell.

* * * * *